US011074719B2

(12) United States Patent
McGarry et al.

(10) Patent No.: US 11,074,719 B2
(45) Date of Patent: Jul. 27, 2021

(54) CALIBRATION FOR VISION SYSTEM

(71) Applicant: COGNEX CORPORATION, Natick, MA (US)

(72) Inventors: John McGarry, San Diego, CA (US); Lowell Jacobson, Grafton, MA (US); Lei Wang, Wayland, MA (US); Gang Liu, Natick, MA (US)

(73) Assignee: Cognex Corporation, Natick, MA (US)

( * ) Notice: Subject to any disclaimer, the term of this patent is extended or adjusted under 35 U.S.C. 154(b) by 181 days.

(21) Appl. No.: 16/301,275

(22) PCT Filed: May 12, 2017

(86) PCT No.: PCT/US2017/032560
§ 371 (c)(1),
(2) Date: Nov. 13, 2018

(87) PCT Pub. No.: WO2017/197369
PCT Pub. Date: Nov. 16, 2017

(65) Prior Publication Data
US 2020/0320740 A1 Oct. 8, 2020

Related U.S. Application Data

(60) Provisional application No. 62/335,414, filed on May 12, 2016.

(51) Int. Cl.
*G06T 7/80* (2017.01)
*G06T 7/33* (2017.01)
*G06T 7/73* (2017.01)

(52) U.S. Cl.
CPC ............... *G06T 7/80* (2017.01); *G06T 7/344* (2017.01); *G06T 7/75* (2017.01); *G06T 2207/30204* (2013.01)

(58) Field of Classification Search
None
See application file for complete search history.

(56) References Cited

U.S. PATENT DOCUMENTS 10,757,394 B1 * 8/2020 Wang .................... G06T 7/0042
2003/0071194 A1 * 4/2003 Mueller ............... H04N 13/221
250/208.1

(Continued)

FOREIGN PATENT DOCUMENTS

| CN | 1468664 A | 1/2004 |
| CN | 1701213 A | 11/2005 |
| GB | 2351627 A | 1/2001 |

OTHER PUBLICATIONS

Chinese Patent Application No. 201780038860.6, First Office Action with translation, dated May 6, 2020, 24 pages.

(Continued)

*Primary Examiner* — Delomia L Gilliard
(74) *Attorney, Agent, or Firm* — Fish & Richardson P.C.

(57) ABSTRACT

A vision system capable of performing run-time 3D calibration includes a mount configured to hold an object, the mount including a 3D calibration structure; a camera; a motion stage coupled with the mount or the camera; and a computing device configured to perform operations including: acquiring images from the camera when the mount is in respective predetermined orientations relative to the camera, each of the acquired images including a representation of at least a portion of the object and at least a portion of the 3D calibration structure that are concurrently in a field of view of the camera; performing at least an adjustment of a 3D calibration for each of the acquired images based on information relating to the 3D calibration structure as imaged in the acquired images; and determining 3D positions, dimensions or both of one or more features of the object.

23 Claims, 11 Drawing Sheets

(56) References Cited

U.S. PATENT DOCUMENTS

| | | | | |
|---|---|---|---|---|
| 2004/0141187 A1* | 7/2004 | Johnston | ............. | G01B 21/042 |
| | | | | 356/608 |
| 2004/0202364 A1* | 10/2004 | Otani | ..................... | G06T 7/593 |
| | | | | 382/154 |
| 2014/0118500 A1* | 5/2014 | Liu | ..................... | H04N 13/204 |
| | | | | 348/46 |
| 2016/0067628 A1* | 3/2016 | Reid | ..................... | A63H 33/22 |
| | | | | 446/484 |

OTHER PUBLICATIONS

International Search Report/Written Opinion dated Aug. 2, 2017, issued by the European Patent Office for PCT/US2017/032560; 17 pages.
Chinese Patent Application No. 201780038860.6, Second Office Action with translation, dated Dec. 28, 2020, 28 pages.

* cited by examiner

CALIBRATION FOR VISION SYSTEM

CROSS-REFERENCE TO RELATED APPLICATIONS

This application claims the benefit of priority under 35 U.S.C. § 119(e)(1) of U.S. Provisional Application No. 62/335,414 filed on May 12, 2016 which is incorporated by reference herein.

TECHNICAL FIELD

This specification relates to calibration for vision systems.

BACKGROUND

A vision system can be used to acquire multiple images for obtaining one or more 3D representations of an object, and to determine at least some dimensions of the object, or of features of the object, based on information from the obtained 3D representations.

An example of a 3D representation of an object is a point cloud. A point cloud is a collection of 3D points in space where each point i can be represented as $(X_i, Y_i, Z_i)$. A point cloud can represent a complete 3D object including the object's back and sides, top and bottom.

Another example of a 3D representation of an object is a range image, which consists of an array of image pixels (typically characterized as positions along orthogonal x and y axes) that also contain a third (height) dimension for each pixel (typically characterized along a z axis perpendicular to the x-y plane).

To facilitate correct inferences from image data, the vision system often provides a setup calibration procedure that establishes a mapping between one or more image coordinate frames and a single shared world coordinate frame. Additional calibration procedures or adjustments to the setup calibration can be performed at various subsequent times, e.g., yearly, monthly, weekly or daily.

SUMMARY

This specification relates to systems and techniques for performing run-time calibration or adjustment for vision systems and measuring dimensions of one or more features of an object.

In general, one or more aspects of the subject matter described in this specification can be embodied in one or more systems, kits, and computer-readable medium encoding a computer program operable to cause a computing device to perform operations.

A vision system capable of performing run-time 3D calibration can include: a mount configured to hold an object, the mount including a 3D calibration structure that includes a flat surface and one or more other surfaces; a camera; a motion stage coupled with the mount or the camera, the motion stage having at least one rotational degree of freedom; and a computing device configured to perform operations including: when the object is held by the mount, acquire images from the camera when the mount is in respective predetermined orientations relative to the camera, each of the acquired images including a representation of at least a portion of the object and at least a portion of the 3D calibration structure that are concurrently in a field of view of the camera; perform at least an adjustment of a 3D calibration for each of the acquired images based on information relating to the 3D calibration structure as imaged in the acquired images; and determine 3D positions, dimensions or both of one or more features of the object based on (i) results of the 3D calibration, and (ii) information relating to the object as imaged in the acquired images.

In various implementations, the 3D calibration structure can include various features. For example, the 3D calibration structure can include periodically spaced features. As another example, the 3D calibration structure can include bars separated by channels, each of the bars including a flat surface forming the flat surface of the 3D calibration structure, and at least one tapered surface forming the one or more other surfaces of the 3D calibration structure. As another example, the 3D calibration structure can include frustums, each of the frustums including a flat surface forming the flat surface of the 3D calibration structure.

In some implementations, the flat surface of the frustum defines a polygon. In some implementations, the polygon is a square. In some implementations, the flat surface of the frustum defines a circle.

In some implementations, the motion stage further includes at least one translational degree of freedom, such that the mount is further translated at the predetermined orientations.

In some implementations, the other surfaces of the 3D calibration structure are lateral surfaces of cylindrical holes in the flat surface.

In some implementations, the mount has a first surface to hold the object, a second, opposing surface for coupling with the motion stage, and a side surface connecting the first and second surfaces, and the 3D calibration structure is formed on the side surface.

In some implementations, the mount further includes identification markings.

In some implementations, the adjustment of the 3D calibration includes run-time completion of the 3D calibration based on the information relating to the 3D calibration structure as imaged in the acquired images.

In some implementations, the computing device is configured to obtain a 3D representation of at least a portion of the 3D calibration structure and at least a portion of the object based on (i) the acquired images, and (ii) the performed adjustment, and extract the information relating to the 3D calibration structure and the information relating to the object from the obtained 3D representation.

In some implementations, the adjustment of the 3D calibration compensates for non-linear distortions, affine distortions, and rigid variations.

In some implementations, the computing device is configured to perform at least the adjustment of the 3D calibration by applying an appropriate one of respective calibration models to each of the acquired images to align the image to a common 3D coordinate frame, wherein the respective calibration models have been generated for the respective predetermined orientations.

In some implementations, the respective calibration models include a common origin and a common coordinate frame.

A kit can include a mount for a vision system, the mount including a 3D calibration structure that includes a flat surface and one or more other surfaces, wherein the 3D calibration structure includes periodically spaced features; and a computer readable medium encoding a calibration model for the 3D calibration structure, the calibration model useable for run-time 3D calibration of the vision system using the 3D calibration structure on the mount.

In some implementations, the other surfaces of the 3D calibration structure are lateral surfaces of cylindrical holes in the flat surface.

In some implementations, the 3D calibration structure includes bars separated by channels, each of the bars including a flat surface forming the flat surface of the 3D calibration structure, and at least one tapered surface forming the one or more other surfaces of the 3D calibration structure.

In some implementations, the 3D calibration structure includes frustums, each of the frustums including a flat surface forming the flat surface of the 3D calibration structure.

A computer-readable medium can encode a computer program operable to cause a computing device to perform operations including: obtaining images of at least a portion of an object and at least a portion of a 3D calibration structure; performing at least an adjustment of a 3D calibration of a vision system based on information relating to the 3D calibration structure as imaged in the obtained images; obtaining a 3D representation of at least a portion of the 3D calibration structure and at least a portion of the object based on (i) the obtained images, and (ii) the performed adjustment; extracting the information relating to the 3D calibration structure and the information relating to the object from the obtained 3D representation; and determining 3D positions, dimensions or both of one or more features of the object based on (i) results of the 3D calibration, and (ii) information relating to the object as imaged in the obtained images.

In some implementations, the obtaining of images includes: instructing a motion stage coupled with a mount holding the object to at least rotate the mount to predetermined orientations relative to a camera for which at least a portion of the object and at least a portion of the 3D calibration structure are concurrently in a field of view of the camera, wherein the mount includes the 3D calibration structure that includes a flat surface and one or more other surfaces; and instructing the camera to acquire images when the mount is in the predetermined orientations.

Particular embodiments of the subject matter described in this specification can be implemented to realize one or more of the following advantages. The disclosed run-time calibration can mitigate accuracy/repeatability concerns related to motion stages of the vision system. For instance, variabilities in stage rotation, tip angle, and the angular run-out of a translation stage can be compensated for. Less expensive and/or precise motion stages can be used.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
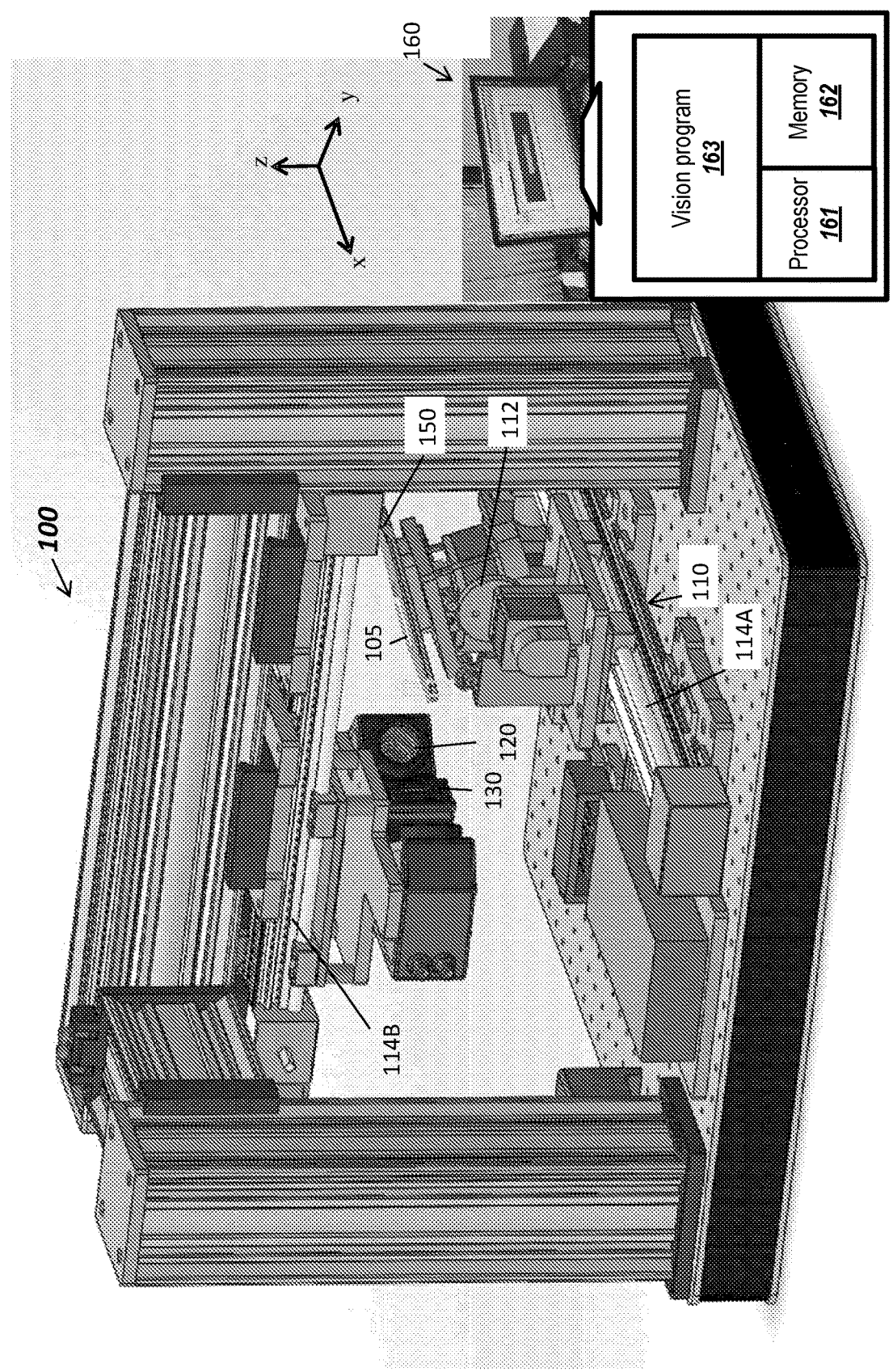
FIG. 1A is a perspective view of an example of a vision system.

FIG. 1 is a perspective view of an example of a vision system 100. The vision system 100 includes a motion stage 110, and one or more other linear stages 114B. The vision system 100 also includes a camera 120, a light source 130, a mount 150 that holds an object 105, and a computing device 160.

The computing device 160 includes a processor 161 and a memory 162, and the computing device 160 can be connected to a network. The processor 161 can be one or more hardware processors, which can each include multiple processor cores. The memory 162 can include both volatile and non-volatile memory, such as Random Access Memory (RAM) and Flash RAM. The computing device 160 can include various types of computer storage media and devices, which can include the memory 162, to store instructions of programs that run on the processor 161. Such programs can include a vision program 163.

The mount 150 is rigidly attached to the motion stage 110 to enable movement of the mount 150. The motion stage 110 includes one or more rotation stages 112 and one or more linear stages 114A to provide one or more rotational degree of freedom and one or more translational degree of freedom to the mount 150.

In some implementations, the one or more rotation stages 112 consist of a single rotation stage for providing a single rotational degree of freedom, e.g., about the X-axis of FIG. 1. In some other implementations, the one or more rotation stages 112 include a first rotation stage and a second rotation stage, wherein the first rotation stage can have a first rotation axis parallel to a surface of the mount 150, e.g., parallel to the X-axis shown in FIG. 1, and the second rotation stage can have a second rotation axis perpendicular to the surface of the mount 150. The second rotation stage can be mounted on the first rotation stage to enable independent control of a roll angle and a yaw angle of the mount 150.

In some implementations, the one or more linear stages 114A consist of a single linear stage for providing a single translational degree of freedom, e.g., along the X-axis shown in FIG. 1. In some other implementations, the one or more linear stages 114A include a first linear stage and a second linear stage to provide two translational degrees of freedom to the mount 150, e.g., along the X- and Y-axes shown in FIG. 1. In yet some other implementations, the one or more linear stages 114A include a first linear stage, a second linear stage, and a third linear stage to provide three translational degrees of freedom to the mount 150, e.g., along the X-, Y-, and Z-axes shown in FIG. 1.

The camera 120 and the light source 130 are rigidly attached to one or more other linear stages 114B. The one or more other linear stages 114B enable movement of the camera 120 and the light source 130 relative to the mount 150. In some implementations, the one or more other linear stages 114B consist of a single linear stage for providing a single translational degree of freedom, e.g., along the Y-axis shown in FIG. 1. In some other implementations, the one or more other linear stages 114B include a first linear stage and a second linear stage to provide two translational degrees of freedom to the mount 150, e.g., along the Y- and Z-axes shown in FIG. 1. In some implementations, one or more rotation stages are mounted onto the linear stages 114B to provide one or more rotational degree of freedom. In some implementations, the vision system 100 can include two or more cameras 120.

The object 105 to be measured by the vision system 100 is mounted on the mount 150. The mount 150 includes a 3D calibration structure, also referred to as a "run-time calibration target", used in run-time calibrations of the vision system 100. Rotation and translation stages of the motion stage 110 can be used to place the mount 150 at multiple predetermined orientations relative to the camera 120 of the vision system 100, such that at least a portion of the object 105 and a portion of the 3D calibration structure of the mount 150 are concurrently illuminated by the light source 130 and in the field of view of the camera 120. Images are then acquired for the predetermined orientations.

Figure 1C:
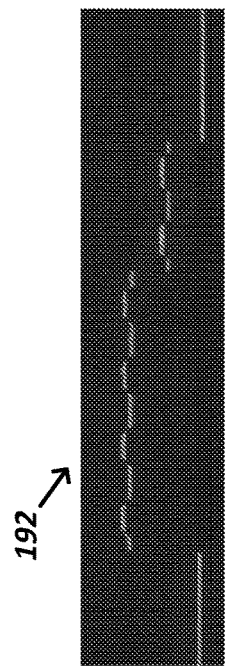
FIGS. 1B-1E show aspects of an example of a process to generate a 3D representation of an object using the vision system.
Figure 1D:
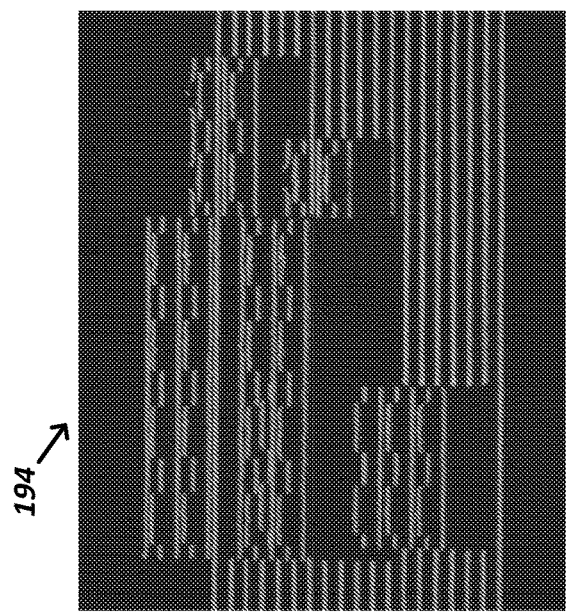
Figure 1B:
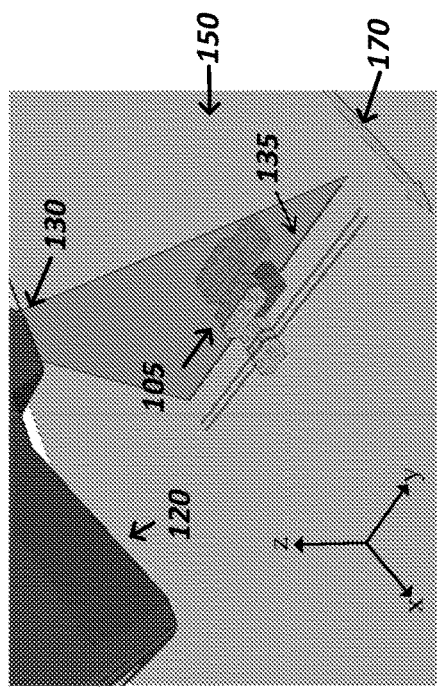

FIGS. 1B-1E show aspects of an example of a process to generate a 3D representation of an object 105 using the vision system. Referring to FIG. 1B, the vision system 100 projects a triangular laser plane (e.g., using the light source 130) onto an object 105 under inspection, illuminating its surface. In some implementations, the light source 130 can be a light emitting diode or a halogen light source. Here, the object 105 is supported by a mount 150. The projection of the laser plane onto the object results in an intersection 135 of the laser plane with the object 105, the shape of which is determined by the surface of the object.

Referring to FIG. 1C, the vision system 100 acquires an intensity image 192 of the intersection 135 (e.g., using the camera 120). The intensity image 192 of the intersection 135 provides height profile information of the object across the line of illumination. Once the intensity image 192 is acquired, referring back to FIG. 1B, the object 105 is moved relative to the camera as indicated by an arrow 170. In some implementations, the relative motion is provided by the motion stage 110, which moves the object relative to the camera 120 and the light source 130. In some other implementations, the relative motion is provided by moving the camera 120 and the light source 130 (e.g., using one or more linear stages 114B). The relative motion can be based on instructions provided by the computing device 160. A series of intensity images (like image 192) is acquired by the vision system 100 while the object is in relative motion with the camera 120 and the light source 130.

Referring to FIG. 1D, the computing device 160 processes the series of intensity images acquired by the vision system 100. For example, the computing device 160 can process each intensity image to extract a line profile of a slice of the object 105. The computing device 160 can then aggregate the extracted line profiles from each intensity image to form an aggregated line profile 194 of the object 105, using an appropriate offset. The appropriate offset, for example, can be determined based on the speed of the relative motion.

Figure 1E:
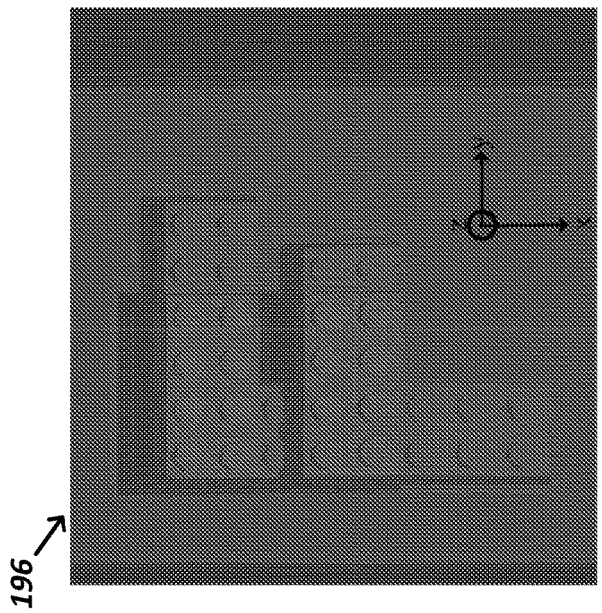

Referring to FIG. 1E, the computing device 160 processes the aggregated line profile 194 and creates a 3D representation 196 of the object 105. Here the 3D representation 196 is output as a range image; however, the 3D representation 196 can be output as a 3D point cloud, for instance. The 3D representation 196 contains 3D information about the object 105 that has been acquired during the scanning process.

A calibration of the vision system 100 can be performed by the computing device 160 to estimate a coordinate transformation between a single world coordinate frame ("3D reference frame") and the separate coordinate frames ("image coordinate frames") of each obtained 3D representations (like the 3D representation 196). In general, performing a calibration includes calculation of model parameters by corresponding the observed measurements on the calibration target against their known values. In some implementations, performing of a calibration is posed as an optimization problem, such as a parameter estimation problem. Optimization algorithms that can be used for performing a calibration can include linear least-squares solution and non-linear numerical search algorithms such as Levenberg-Marquardt algorithm.

The calibration can include a factory calibration, a field calibration, and a run-time calibration. The factory calibration, for example, can remove static errors such as camera lens distortion and perspective distortion that are related to the optical design and the geometry of the vision system 100. The field calibration, for example, can determine scan motion direction relative to the camera, and the relative 3D pose (rotation and translation) among multiple cameras, for systems containing multiple cameras. The run-time calibration, for example, can remove dynamic errors that may change from scan to scan. Examples of dynamic errors include non-linear distortions, affine ("linear") distortions, and rigid variations in translation and/or orientation. Non-linear distortions, for example, can be caused by run-time variation in an encoder signal. Affine distortions, for example, can include a shear caused by a variation in the angle between the laser plane and the direction of relative motion of the object with respect to the camera. Rigid variations, for example, can be caused by inaccuracies in rotation and/or translation of the mount 150 or the camera 120.

Calibration data can contain information such as a transformation matrix that can be used to create a 3D representation that closely represents the physical contours of the object. The calibrated 3D representation, then, allows dimension measurements and the calculation of parameters like the exact volume of the object. The vision program 163 can be used to perform the steps shown in FIGS. 1B-1E. Examples of the vision program 163 can include commercial software tools, such as the VisionPro software by Cognex Corporation of Natick, Mass.

The run-time calibration can mitigate accuracy and/or repeatability concerns related to various motion stages of the vision system 100 (e.g., the motion stage 110). As long as the motion stages are rigid, variabilities in stage rotation, tip angle, and the angular run-out of a translation stage can be compensated for. In some cases, less expensive motion stages (e.g., linear motion stage(s), rotation motion stage(s), or both) can be used as a result.

Figure 2A:
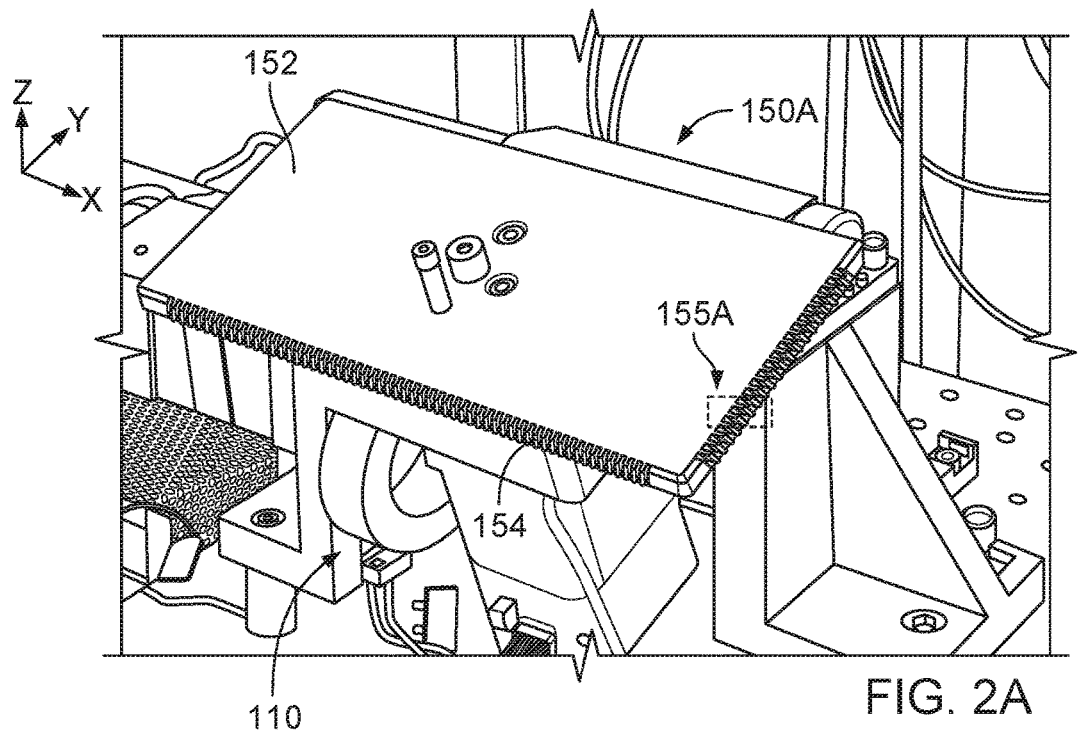
FIG. 2A is a perspective view of a first example of a mount with a first 3D calibration structure.

FIG. 2A is a perspective view of a first example of a mount 150A with a first 3D calibration structure 155A. The mount 150A includes a first surface 152 and a side surface 154. The first surface 152 supports the object 105 when mounted. A second surface of the mount 150A (not shown) attaches to the motion stage 110. The side surface 154 is formed between the first surface 152 and the second surface. The first 3D calibration structure 155A is formed on the side surface 154 of the mount 150A.

Figure 2B:
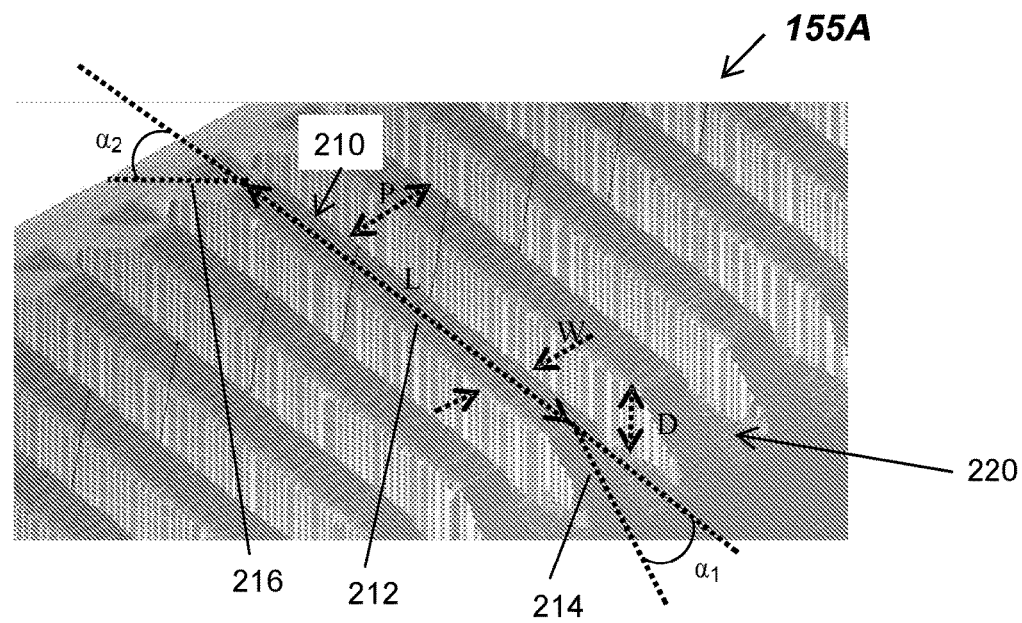
FIG. 2B is a close-up perspective view of the first 3D calibration structure.

FIG. 2B is a close-up perspective view of the first 3D calibration structure 155A. The first 3D calibration structure 155A includes a plurality of bars 210 separated by channels 220. The bar 210 includes a flat surface 212, a first tapered surface 214, a second tapered surface 216. The bar 210 has a width W, a length L, and a depth D. The depth D is measured from a surface of the channels 220 to the flat surface 212. The length L is measured between the first tapered surface 214 and the second tapered surface 216. The first tapered surface 214 is tilted relative to the flat surface 212, forming a first tilt angle α1 as shown in FIG. 2B. The second tapered surface 216 is tilted relative to the flat surface 212, forming a second tilt angle α2 as shown in FIG. 2B. Individual bars 210 of the plurality of bars are periodically spaced to have a pitch P, forming periodic features.

Each bar 210 has a known 3D position in the overall design of the first 3D calibration structure 155A. By locating each of the bars 210 in a 3D representation of the first 3D calibration structure 155A, the vision system 100 can calibrate the relationship between an image coordinate frame and a single shared world coordinate frame. In this case, the single shared world coordinate frame is defined with a rigid spatial relationship with respect to the first 3D calibration structure 155A, and the single shared world coordinate frame moves with the mount 150a. Furthermore, in some implementations, each bar 210 of the first 3D calibration structure 155A can be used to define a local 3D coordinate frame with respect to which the vision system 100 can calibrate dimension measurements.

In some implementations, the width W can have a range of 0.10-0.50 mm, e.g., 0.25 mm. The length L can have a range of 0.5-2.0 mm, e.g., 1.4 mm. The depth D can have a range of 0.10-0.50 mm, e.g., 0.25 mm. The pitch P can have a range of 0.20-1.00 mm, e.g., 0.50 mm. The first tilt angle α1 can have a range of 10-60 degrees, e.g., 45 degrees. The second tilt angle α2 can have a range of 10-60 degrees, e.g., 45 degrees.

In some implementations, the plurality of bars consists of bars with identical characteristics. In some other implementations, the plurality of bars includes bars with different characteristics. For example, the width of the bar can change across the side surface 154. The change in width can be described by mathematical functions, such as polynomial functions, sinusoidal functions, and exponential functions. In some implementations, identification markings can be provided on the flat surface 212 or in the vicinity of each bar 210 to identify each bar.

In some implementations, the pitch P can change across the side surface 154. The change in pitch P can be described by mathematical functions, such as polynomial functions, sinusoidal functions, and exponential functions.

Figure 2C:
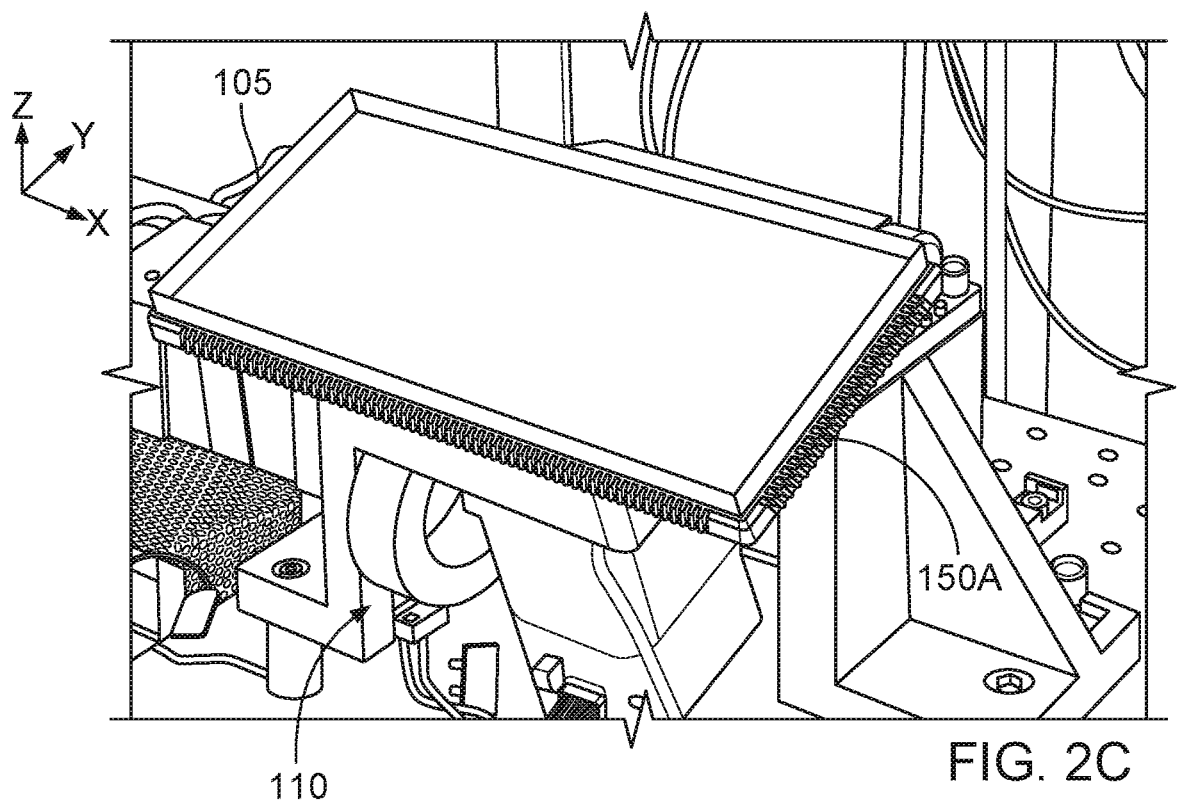
FIG. 2C is a perspective view of an object mounted on the first example of the mount with the first 3D calibration structure.

FIG. 2C is a perspective view of the object 105 mounted on the first example of the mount 150A with the first 3D calibration structure 155A. When mounted, at least a portion of the object 105 and a portion of the first 3D calibration structure 155A of the first mount 150A are concurrently in the field of view of the camera 120 of the vision system 100.

Figure 3A:
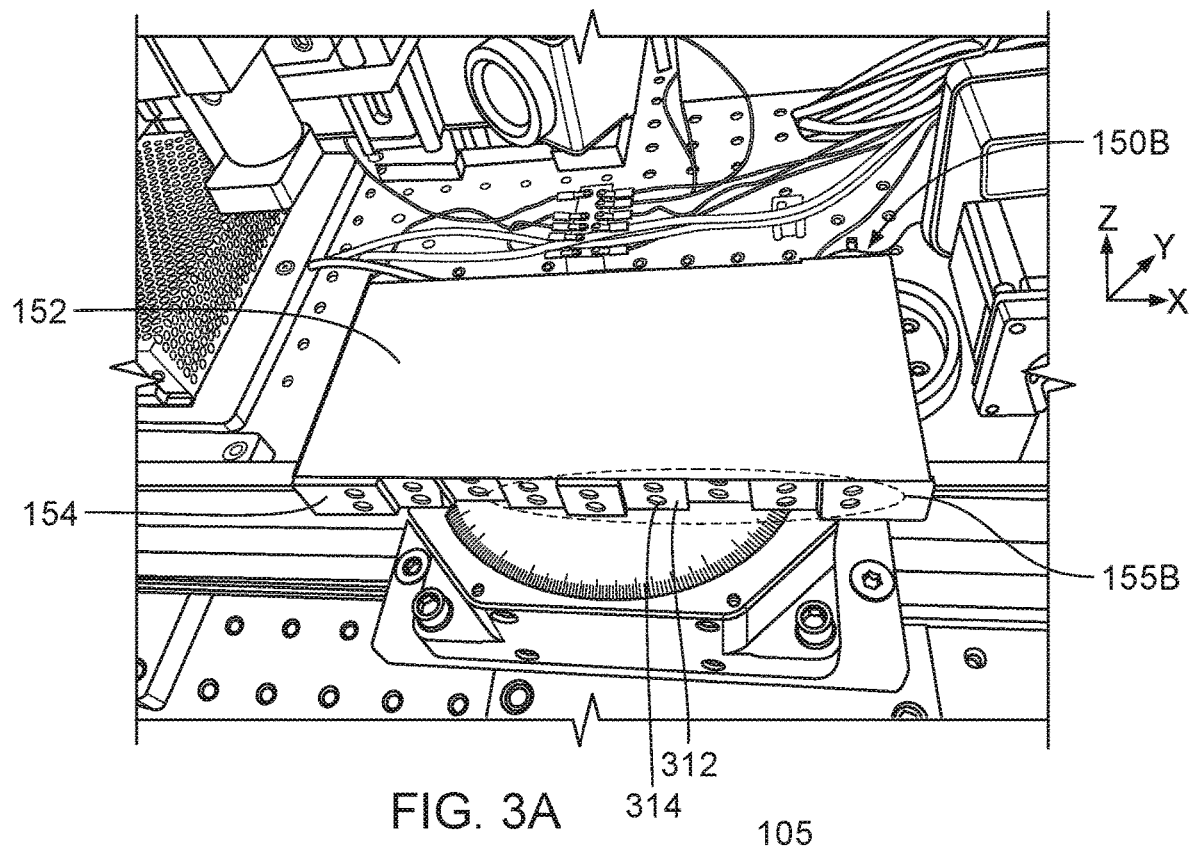
FIG. 3A is a perspective view of a second example of a mount with a second 3D calibration structure.

FIG. 3A is a perspective view of a second example of a mount 150B with a second 3D calibration structure 155B. The second mount 150B is similar to the first mount 150A, but the second 3D calibration structure 155B includes a plurality of staired-facets. The plurality of staired-facets include two or more facets 312. The facets 312 are parallel to each other, and repeat periodically across the side surface 154, forming periodic features. The facets 312 that are located adjacent to one another are positioned at a different height (e.g., along the Y-axis) with respect to each other. The facets 312 include two or more round holes (e.g. cylinder holes) that include a side surface 314. In some implementations, the side surface 314 is orthogonal to the facets 312. In some implementations, the side surface 314 is tapered inward towards the center of the hole to improve visibility of the side surface 314 by the camera 120.

In some implementations, the width of the facet (e.g., dimension along the X-axis) can have a range of 5-20 mm, e.g., 10 mm. The length of the facet (e.g., dimension along the Z-axis) can have a range of 5-25 mm, e.g., 15 mm. The difference in height between adjacent facets 312 can have a range of 1-5 mm, e.g., 2 mm. The diameter of the round holes can have a range of 1-5 mm, e.g., 3 mm. The pitch between two or more round holes can have a range of 8-16 mm, e.g., 12 mm. The depth of the round holes can have a range of 1-5 mm, e.g., 3 mm.

Figure 3B:
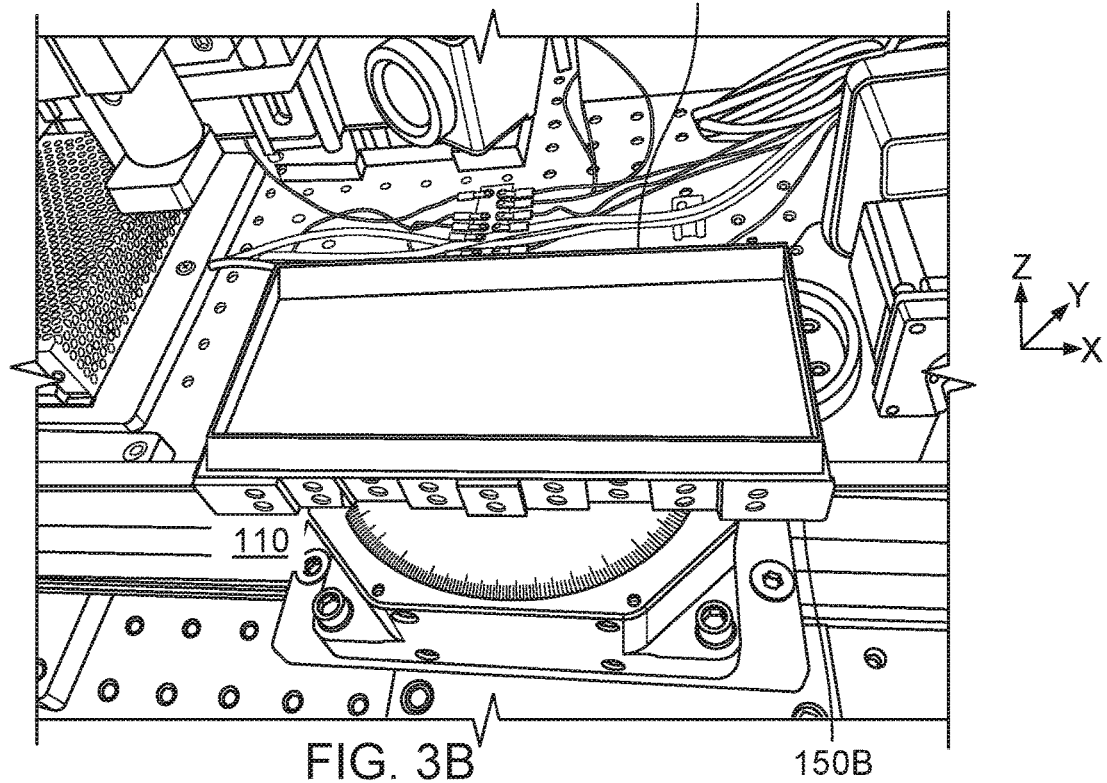
FIG. 3B is a perspective view of an object mounted on the second example of the mount with the second 3D calibration structure.

FIG. 3B is a perspective view of the object 105 mounted on the second example of the mount 150B with the second 3D calibration structure 155B. When mounted, at least a portion of the object 105 and a portion of the second 3D calibration structure 155B of the second mount 150B are concurrently in the field of view of the camera 120 of the vision system 100.

FIGS. 4A-4D are perspective views of scans A,B,C,D used for obtaining a 3D representation of an object 105 mounted on a mount 150A with a 3D calibration structure. Referring to FIGS. 4A-4D, the motion stage 110 has two rotational degrees of freedom θ and φ. θ ('theta') is a roll angle of the orientation of the mount 150A relative to the camera 120 during a scan. Theta can be varied to acquire images of a side of the object 105 from different viewing angles. φ ('phi') is a yaw angle of the orientation of the mount 150A relative to the camera 120 during a scan. Phi can be varied to acquire images of different sides of the object 105. The motion stage 110 also has three translational degrees of freedom along the X-,Y-, and Z-axes. Translation along the X-axis can provide the relative motion of the object 105 with respect to the camera 120 during a scan. Translation along the Y- and Z-axes can provide compensation for the "swing" caused by the theta rotation, to maintain a constant distance between the camera 120 and a side of the object 105 being acquired. For example, the "swing" can be caused by different dimensions of the sides of the object 105.

Referring to FIG. 3B, the object 105, for example, can have a shape of an open box with 4 raised sidewalls. To capture features of the object 105 that may otherwise be occluded or 'shadowed' during a scan in a particular orientation, multiple scans can be performed with different spatial orientations of the object 105 (e.g., different angles with respect to the camera 130).

Figure 4A:
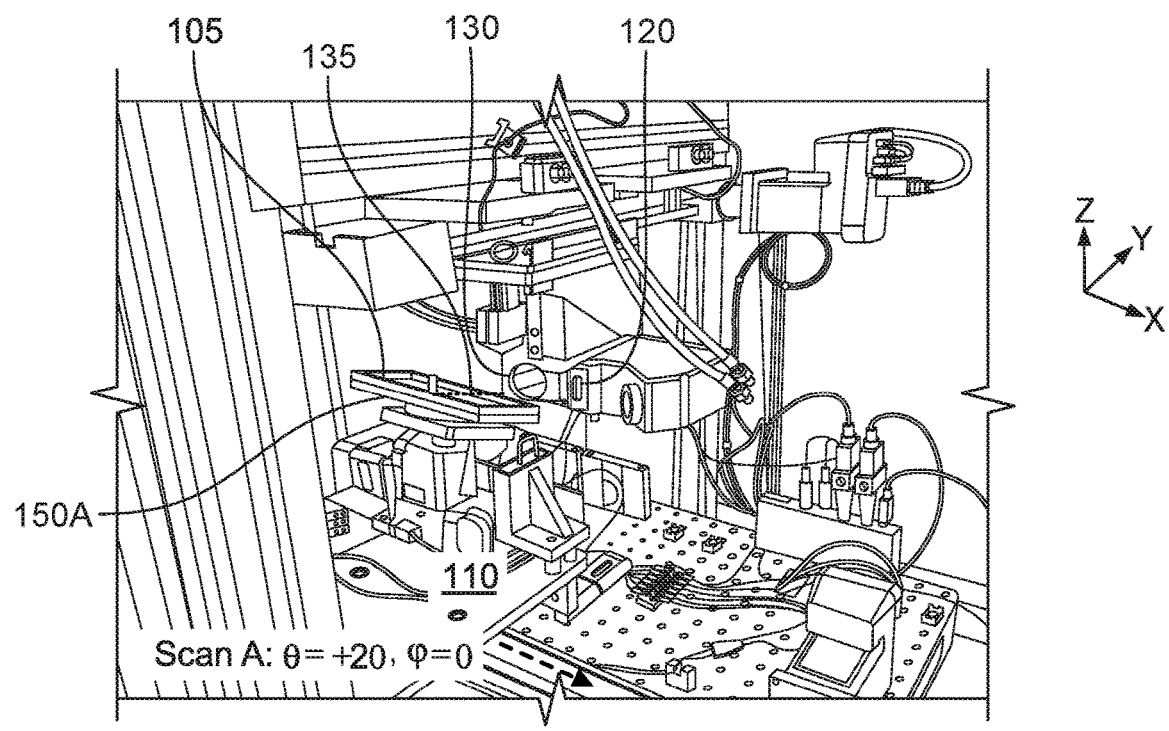
FIGS. 4A-4D are perspective views of scans A,B,C,D used for obtaining a 3D representation of an object mounted on a mount with a 3D calibration structure.

Referring to FIG. 4A, scan A is performed with θ=+20° and φ=0°. In this state, the object 105 is rolled, or titled, towards the camera, and the intersection 135 is projected across the object 105 as shown. During the scan A, the vision system 100 can acquire images of a first long side of the mount 150A, each of the images containing a first portion of the first 3D calibration structure 155A and a first portion of the object 105 including a first raised sidewall. In this state, the camera 130 is looking 'down' at the first raised sidewall.

Figure 4B:
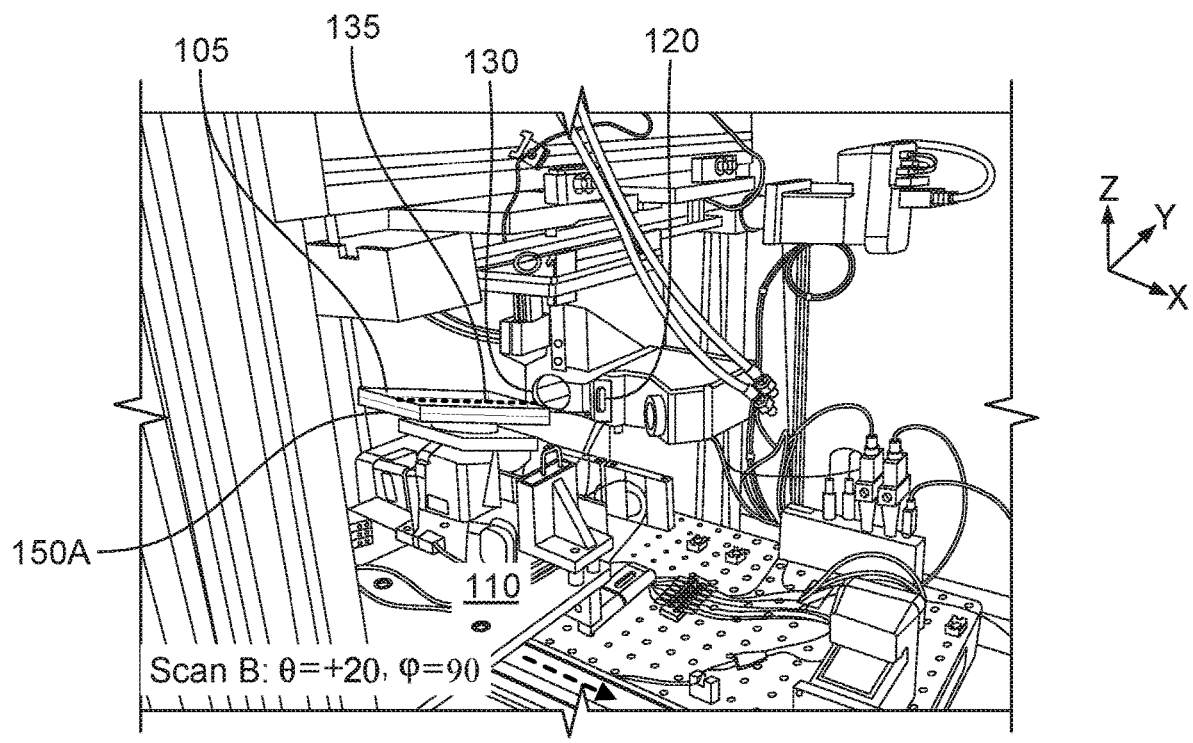

Referring to FIG. 4B, scan B is performed with θ=+20° and φ=90°. In this state, the object 105 is yawed, or rotated about the axis perpendicular to the first surface 152 of the first mount 150A, by 90 degrees. During the scan B, the vision system 100 can acquire images of a first short side of the mount 150A, each of the images containing a second portion of the first 3D calibration structure 155A and a second portion of the object 105 including a second raised sidewall. In this state, the camera 130 is looking 'down' at the second raised sidewall.

Figure 4C:
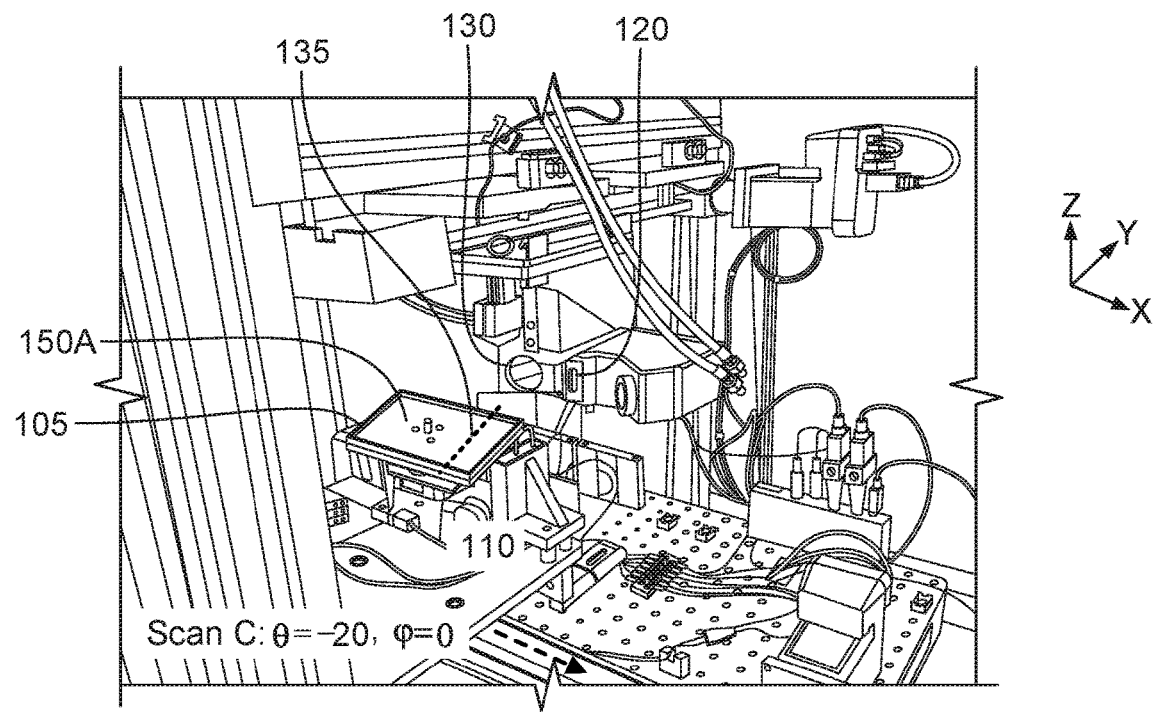

Referring to FIG. 4C, scan C is performed with θ=−20° and φ=0°. In this state, the object 105 is rolled, or titled, away from the camera. During the scan C, the vision system 100 can acquire images of the first long side of the mount 150A from a different perspective than during the scan A, as the camera 130 is looking 'up' at the first raised sidewall in this state. Such scanning performed at different perspectives of the object 105 can enable capturing of features of the object 105 that may otherwise be occluded or 'shadowed' during scans in the previous orientations.

Figure 4D:
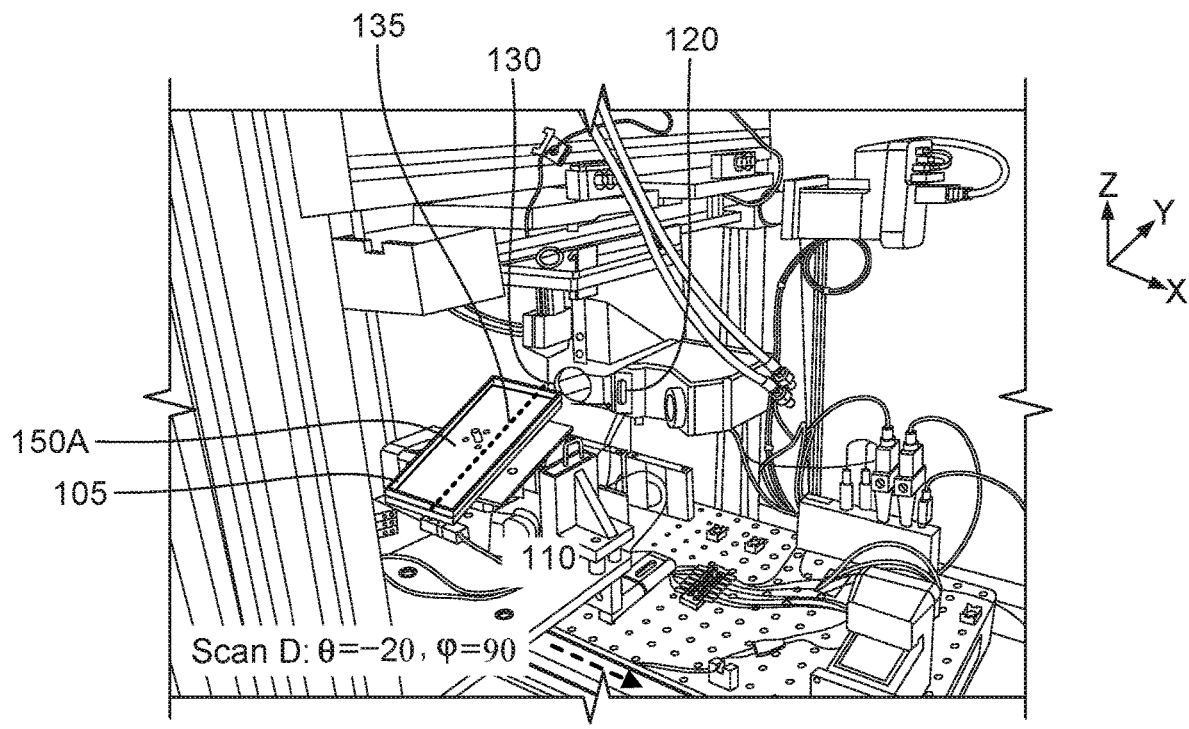

Referring to FIG. 4D, scan D is performed with θ=−20° and φ=90°. In this state, the object 105 is additionally yawed by 90 degrees from the orientation in scan C. During the scan D, the vision system 100 can acquire images of the first short side of the mount 150A from a different perspective than during the scan B, as the camera 130 is looking 'up' at the second raised sidewall in this state. Similarly to scan C, such scanning performed at different perspectives of the object 105 can enable capturing of features of the object 105 that may otherwise be occluded or 'shadowed' during scans in the previous orientations.

Additional scans with θ=+20° and φ=180°, θ=+20° and φ=270°, θ=−20° and φ=180°, and θ=−20° and φ=270° can be performed to acquire images of the remaining two sides of the object 105.

Figure 5A:
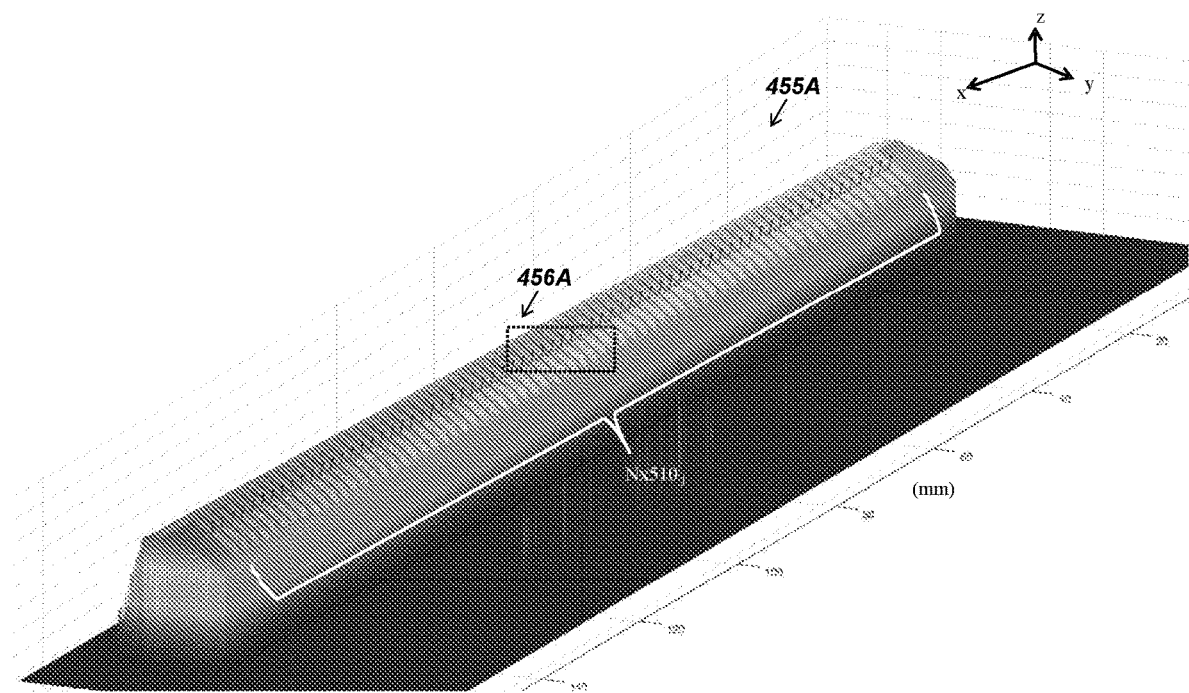
FIGS. 5A-5B are perspective views of a 3D representation of a portion the first 3D calibration structure.
Figure 5B:
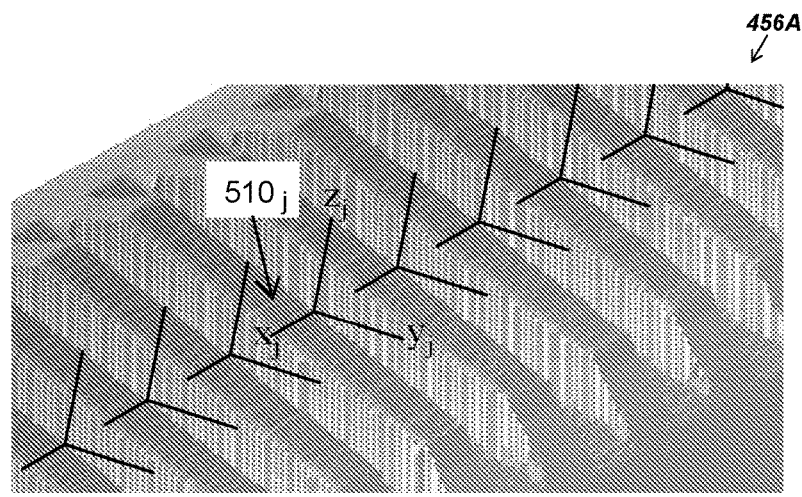

FIGS. 5A-5B are perspective views of a 3D representation 455A of a portion of the first 3D calibration structure 155A. The 3D representation 455A can be obtained as part of the run-time calibration performed by the computing device 160 based on images acquired during scans A, B, C, and D. The 3D representation 455A includes representations of respective N bars $210_j$ visible within the field of view of the camera 120 for a given scan, where j=2 ... N, and N≤61 for a long side of the mount 150A, or N≤39 for short side of the mount 150A. The bars $510_j$ from the 3D representation 455A of the first 3D calibration structure 155A are a 3D representation of the N bars $210_j$. A sub-region 456A of the 3D representation 455A includes multiple bars $510_j$. Referring to FIG. 5B, a close up of the sub-region 456A is shown. $(X_j, Y_j, Z_j)$ is a $j^{th}$ Cartesian coordinate relating to representation $510_j$ of the $j^{th}$ bar $210_j$ from the 3D representation 455A of the first 3D calibration structure 155A obtained as part of the run-time calibration performed by the computing device 160.

A run-time alignment model can be generated by the computing device 160 as a part of the run-time calibration of the vision system 100. The run-time alignment model can be generated, for example, based on a coordinate transformation that best fits a calibration model (e.g., a "train-time 3D model") of at least a part of the first 3D calibration structure 155A to the 3D representation 455A. The calibration model, for example, can be an "ideal" 3D representation of the calibration structure 155A generated based on design-time knowledge of the calibration structure, e.g., a Computer Aided Design (CAD) design used to manufacture the calibration structure. In this example, each of the flat surfaces 212 of bars 210 can be used to accurately determine the pose of the 3D representation 455A in the image coordinate frame of the 3D representation 455A.

A fitting routine of vision program 163 can be used to separately fit a plane to the 3D points comprising each of the flat surfaces 212 of the bars 210. An example of the fitting routine is a Random Sample Consensus (RANSAC) fitter (M. A. Fischler and R. C. Bolles, "Random Sample Consensus: A Paradigm for Model Fitting with Applications to Image Analysis and Automated Cartography," Communications of the ACM, Vol. 24, No. 6, 1981, pp. 381-395). In cases where the flat surfaces are coplanar by design, as is the case for the 3D calibration structure 155A, a common plane can be fit to the combined set of 3D points from multiple flat surfaces 212. Based at least on the foregoing information, a coordinate transformation that best fits the calibration model to the 3D representation 455A can be determined. The result of the coordinate transformation is the run-time calibration alignment model.

Figure 6A:
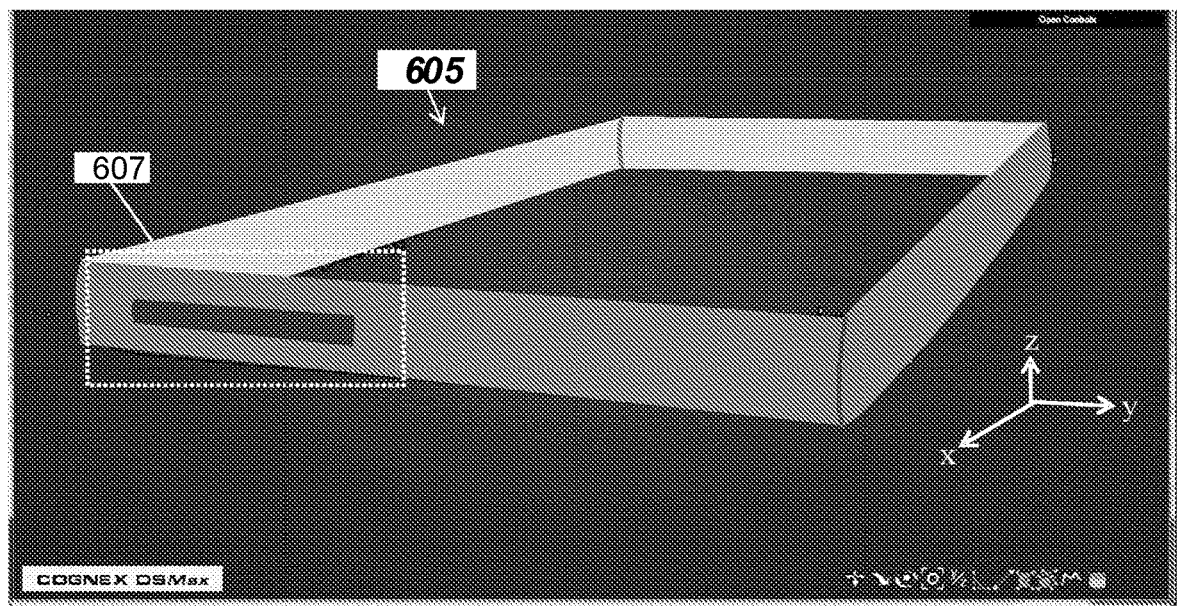
FIG. 6A is a perspective view of a 3D representation of an object formed by the vision system.

FIG. 6A is a perspective views of a 3D representation 605 of the object 105 formed by the vision system 100. The 3D representation 605 of the object 105 is formed, by the computing device 160, based on calibration, by stitching together multiple 3D representations of portions of the object 105. In this case, the multiple 3D representations of the object 105 have been obtained based on images acquired by camera 120 during scans A-D, e.g., as described above in connection with FIGS. 1D-1E. The 3D representation 605 includes a feature 607.

Figure 6B:
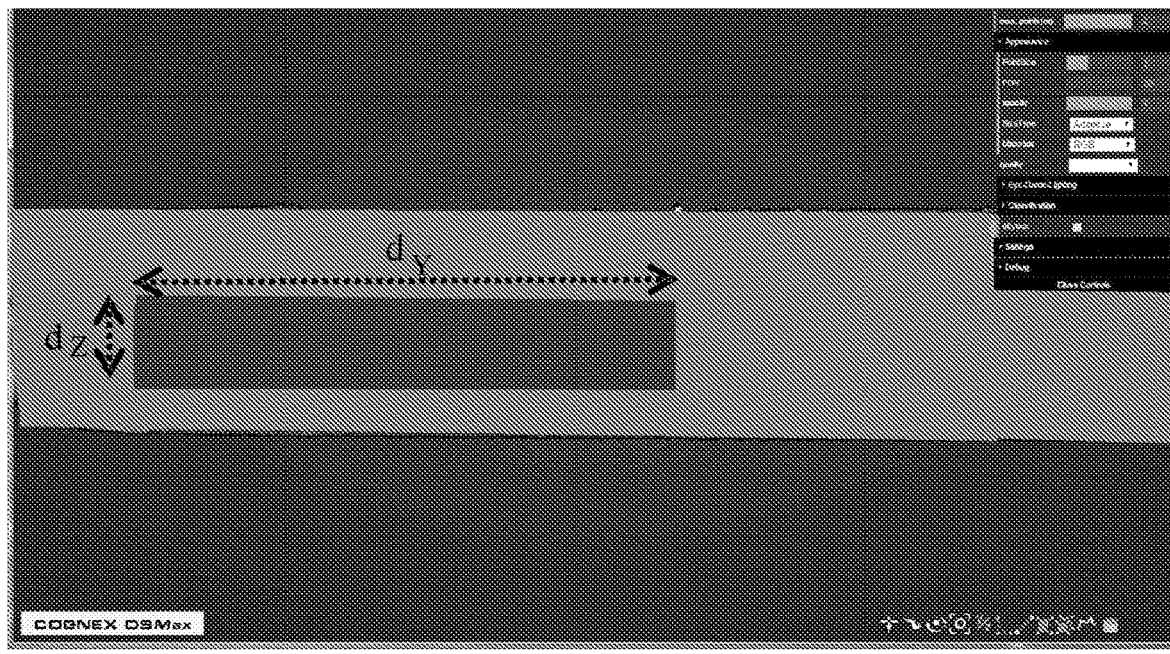
FIG. 6B is a close-up view of a feature of a 3D representation.

FIG. 6B is a close-up view of the feature 607 of the 3D representation 605. The dimensions $d_Y$ and $d_Z$ of feature 607 can be determined, by the computing device 160, from the 3D representation 605. For example, the dimensions $d_Y$ and $d_Z$ can be determined by calculating Euclidean distances between Cartesian coordinates corresponding to respective corners of the feature 607.

Figure 7A:
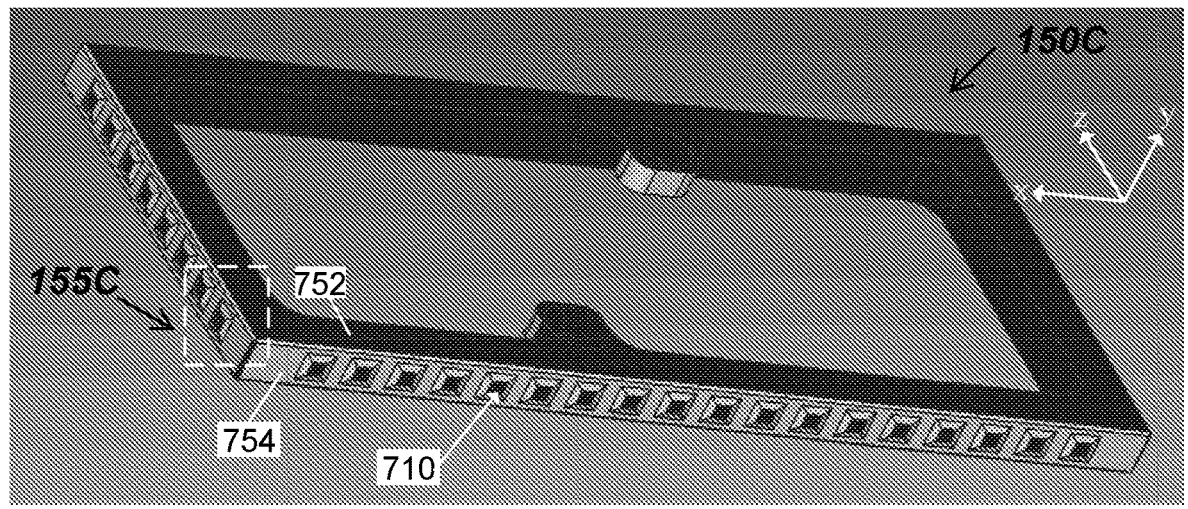
FIG. 7A is a perspective view of a third example of a mount with a third 3D calibration structure.

FIG. 7A is a perspective view of a third example of a mount 150C with a third 3D calibration structure 155C. The third mount 150C is similar to the first mount 150A except as described. The third mount 150C, for example, can have a center cutout, leaving an outer frame having a first surface 752 and a side surface 754. In this case, the object 105 can be mounted in the center cutout region, so the mounted object can protrude above and/or below the X-Z plane of the mount 150C. The third 3D calibration structure 155C includes a plurality of frustums 710.

Figure 7B:
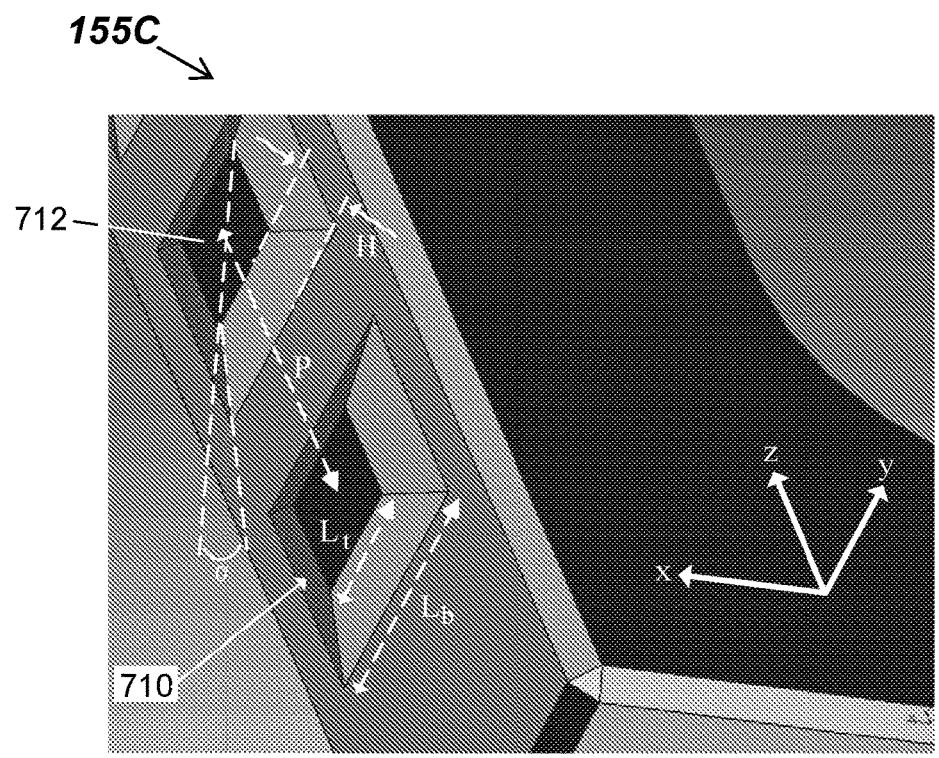
FIG. 7B is a close-up perspective view of the third 3D calibration structure and illustrates some of the plurality of frustums.

FIG. 7B is a close-up perspective view of the third 3D calibration structure 155C and illustrates some of the plurality of frustums 710. A frustum 710 includes a flat surface 712 and one or more sloped side surfaces. The frustum 710 has a bottom length $L_b$, a top length $L_t$, a height H, and a sidewall angle α. In the example shown in FIG. 7B, the frustum 710 is a pyramidal frustum with 4 sloped side surfaces, and the frustums 710 are periodically positioned along the side surface 754 with a pitch P, forming periodic features. The frustum 710 of the third calibration structure 155C can be designed to avoid self-occlusion, e.g., one frustum blocking other frustums in the field of view of the camera 120, over a wide range of rotational orientations of the mount 150C with respect to the camera 120.

In some implementations, the bottom length $L_b$ can have a range of 2-10 mm, e.g., 5.0 mm. The top length $L_t$ can have a range of 1-5 mm, e.g., 2.5 mm. The height H can have a range of 0.1-1 mm, e.g., 0.4 mm. The pitch P can have a range of 3-16 mm, e.g., 8 mm. The sidewall angle α can have a range of 5-25 degrees, e.g., 12.8 degrees. In some implementations, the flat surface 712 of the frustum 710 can have various shapes, including circle and polygons with N vertices where 3≤N≤20, including triangles, squares, and rectangles.

Figure 7C:
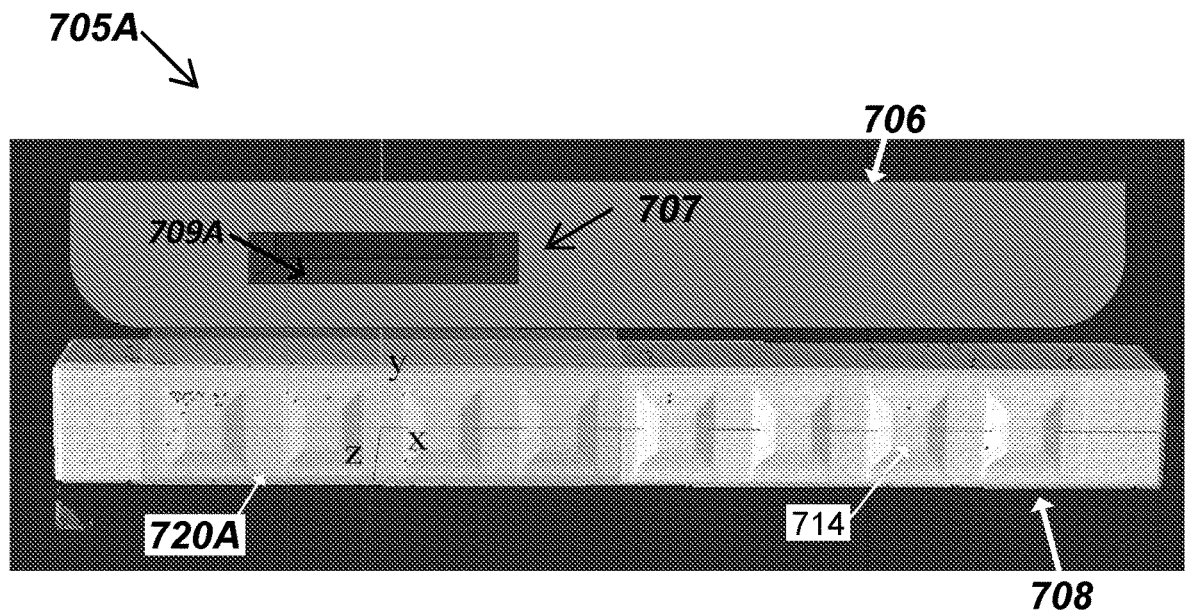
FIGS. 7C-7D are perspective views of a 3D representation of an object mounted on the third example of the mount formed by the vision system.
Figure 7D:
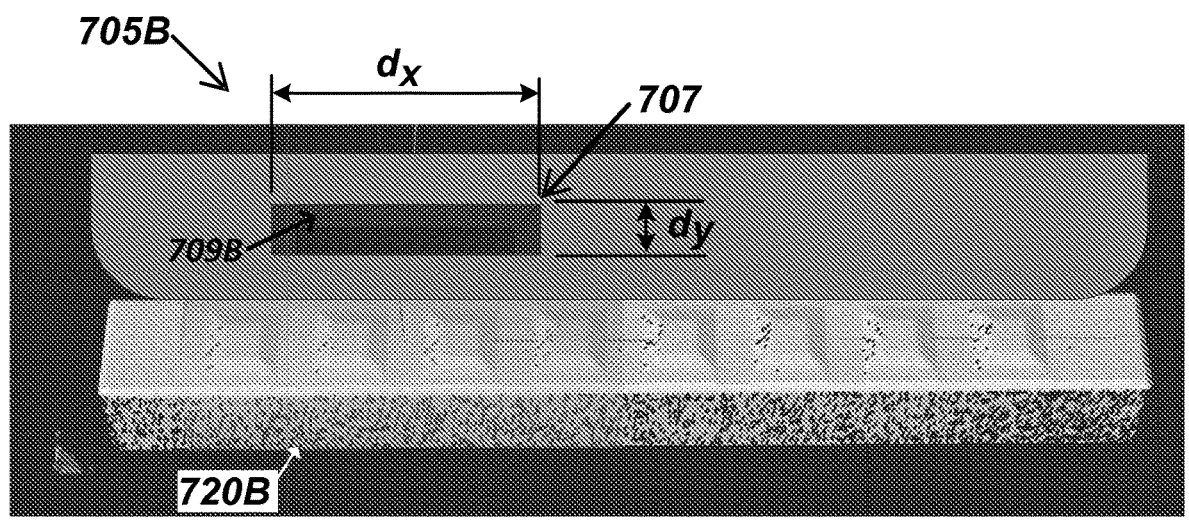

FIGS. 7C-7D are perspective views of a 3D representation 705 of an object 105 mounted on the mount 150C formed by the vision system 100. The 3D representation 705 includes a first 3D representation 706 of a portion of the object 105 and a second 3D representation 708 of a portion of the mount 150C. The first 3D representation 706 includes a feature 707. The second 3D representation 708 includes 3D representations 714 of the frustums 710. The 3D representation 705 can be formed in a manner similar to the 3D representation 605. FIGS. 7C-7D show run-time alignment model 720 that uses the 3D representations 714 of the frustums 710. The run-time alignment model 720 includes two sub-models 720A and 720B.

Referring to FIG. 7C, the 3D representation 705A includes a bottom interior surface patch 709A inside the feature 707. The bottom interior surface patch 709A can be obtained, for example, by orienting the mount 150C to have a positive theta value, e.g., θ=+20° as shown in FIG. 4B during a scan. Referring to FIG. 7D, the 3D representation 705B includes a top interior surface patch 709B inside the feature 707. The top interior surface patch 709B can be obtained, for example, by orienting the mount 150C to have a negative theta value, e.g., θ=−20° as shown in FIG. 4D during a scan.

Based on the multiple 3D points present on the top interior surface patch 709B and the bottom interior surface patch 709A, the dimension $d_y$ can be more accurately determined than by measuring edges of the feature 707. For example, distance between opposing pairs of 3D points on the respective patches can be individually calculated, then averaged over at least a portion of the patches 709A and 709B to more accurately determine $d_y$. As another example, two planes can be separately fitted to the top patch 709B and the bottom patch 709A. Then, the dimension $d_y$ can be determined based on an average separation between the two fitted planes. The dimension $d_x$ can similarly be determined using multiple 3D points of left and right interior surface patches.

Referring to FIG. 7C, the run-time alignment sub-model 720A is generated as a part of the run-time calibration of the vision system 100. The run-time alignment sub-model 720A can be generated, for example, based on a coordinate transformation that best fits a calibration model (e.g., a "train-time 3D model") of at least a part of the 3D calibration structure 155C to the 3D representation 705A formed by the vision system 100. In this example, each of the flat surfaces of the 3D representations 714 of the frustums 710 can be used to accurately determine a run-time pose of the 3D representation 705A.

In some implementations, the run-time alignment model 720 spans over a portion of the second 3D representation 708 that includes the 3D representations 714 of the frustums 710. In the example shown in FIGS. 7C-7D, the alignment sub-models 720A and 720B span over 4 frustums. In some other implementations, the run-time alignment model 720 spans over the entire second 3D representation 708. It is noted that expanding the span of the run-time alignment model 720 can potentially provide better calibration accuracy, but it can increase the time taken to complete the calibration.

In general, the calibration model can be a synthetic model or a train-time model. For example, a calibration can be generated from an "ideal", or synthetic, 3D representation of the calibration structure 155C generated based on design-time knowledge (e.g., a CAD design, mathematical model, or geometrical model) of the calibration structure 155C. Alternatively, the calibration model can be an image-based model generated from a 3D representation of a mount obtained at train-time of the vision system 100, without prior knowledge of the structure of the mount. For example, at train-time, a 3D representation of a mount is obtained. Then, an origin and a coordinate frame for the 3D representation (e.g., a 6 degree of freedom (6-DOF) origin defining a train-time pose with respect to the single shared world coordinate frame) are specified by the vision system 100 to form a train-time 3D model. In some implementations, the origin and the coordinate frame are provided to the vision system 100 by a user.

The coordinate transformation for generating the run-time alignment model 720 represents a run-time pose of the object 105. The run-time pose can be different from the train-time pose, as it incorporates the effects of dynamic distortions that may result from variabilities of the vision system 100, including variabilities of the motion stage 110 in the roll, yaw, and angular run-out of the translation stage. Therefore, the run-time pose can be used to transform an image coordinate frame of a 3D representation obtained at run-time (e.g., 3D representations 705A and 705B) to the single shared world coordinate frame as defined at train-time, in which dimensional measurements can be made accurately and free of dynamic distortions.

In some implementations, a single calibration model can be used to generate the run-time alignment model 720 for 3D representations obtained from various rotational orientations of the mount 150C. The single calibration model, for example, can be a train-time 3D model obtained from a frontal view (e.g., θ=0°). In some other implementations, individual train-time 3D models can be generated for respective rotational orientations of the mount 150C. For example, a train-time 3D model can be generated for each of the rotational orientations of the mount 150C in scans A-D of FIGS. 4A-4D. For the present examples shown in FIGS. 7C-7D, the run-time alignment sub-models 720A and 720B can be generated from individual, orientation-specific train-time models. The use of orientation-specific train-time 3D model reduces the difference between the run-time pose of the 3D representations obtained from different scans and the train-time pose of the respective train-time 3D models, as each train-time model has been specifically generated for the respective orientation of the mount. The reduced difference in pose between train-time and run-time can enable more accurate determination of dimensions, positions, or both.

The respective 6-DOF origins of train-time 3D models generated for different rotational orientations can establish a common origin and a common coordinate frame across the train-time 3D models. The common origin and the common coordinate frame can be established in various ways. In some implementations, a 6-DOF origin is first defined on a frontal-view train-time 3D model. For example, the 6-DOF origin can be the geometrical center of the flat surface 712 with the coordinate frame as shown in FIG. 7B. Then, subsequent train-time 3D models of different rotational orientations can be generated by obtaining a 3D representation; determining, for the obtained 3D representation, a 3D point and a coordinate frame that is congruent to the 6-DOF origin defined for the frontal-view train-time 3D model; and setting the determined 3D point and the coordinate frame as the 6-DOF origin of the subsequent train-time 3D models.

In some implementations, the 6-DOF origin of a train-time 3D model can be defined as a set of geometrical relationships with respect to the geometrical features of a calibration structure. For example, a pyramidal frustum has four side surfaces that define the flat surface 712. A 6-DOF origin can then be defined, for example, as the geometrical center of the plane formed by the intersections of the four side surfaces, with a coordinate frame defined based on the vertices and an orthogonal vector of the flat surface 712. Based on these geometrical relationships, the vision program 163 can automatically search for the four side surfaces forming a frustum in a 3D representation, and set the 6-DOF origin according to the definition.

In general, the side surface 154 or side surface 754 can include, in addition to the 3D calibration structure, identification markings including IDs, barcodes, and identifying information. For example, the identification markings can be directed to identification of the 3D calibration structure on the mount to inform the vision program 163 in selection of a corresponding calibration model for use in performing the run-time calibration.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, a computing device. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "computing device" encompasses all apparatus, devices, and machines for processing data, including by way of example a programmable processor, a computer, or multiple processors or computers. The computing device can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A vision system capable of performing run-time calibration, the vision system comprising:
   a mount configured to hold an object, the mount comprising a 3D calibration structure that includes a flat surface and one or more other surfaces;
   a camera;
   a motion stage coupled with the mount or the camera, the motion stage having at least one rotational degree of freedom; and
   a computing device configured to perform operations comprising:
   when the object is held by the mount,
      acquire images from the camera when the mount is in respective predetermined orientations relative to the camera, each of the acquired images including a representation of at least a portion of the object and at least a portion of the 3D calibration structure that are concurrently in a field of view of the camera;
      perform at least an adjustment of a 3D calibration for each of the acquired images based on information relating to the 3D calibration structure as imaged in the acquired images, wherein the computing device is configured to perform at least the adjustment of the 3D calibration by applying one of respective calibration models to each of the acquired images to align the image to a common 3D coordinate frame, wherein the respective calibration models have been generated for the respective predetermined orientations; and
      determine 3D positions, dimensions or both of one or more features of the object based on (i) results of the 3D calibration, and (ii) information relating to the object as imaged in the acquired images.

2. The vision system of claim 1, wherein
   the 3D calibration structure comprises periodically spaced features, and
   the motion stage further comprises at least one translational degree of freedom, such that the mount is further translated at the predetermined orientations.

3. The vision system of claim 2, wherein the mount further comprises identification markings.

4. The vision system of claim 1, wherein the one or more other surfaces of the 3D calibration structure are lateral surfaces of cylindrical holes in the flat surface.

5. The vision system of claim 1, wherein the 3D calibration structure comprises bars separated by channels, each of the bars including
   a flat surface forming the flat surface of the 3D calibration structure, and
   at least one tapered surface forming the one or more other surfaces of the 3D calibration structure.

6. The vision system of claim 1, wherein the 3D calibration structure comprises frustums, each of the frustums including
   a flat surface forming the flat surface of the 3D calibration structure.

7. The vision system of claim 6, wherein the flat surface defines a polygon.

8. The vision system of claim 7, wherein the polygon is a square.

9. The vision system of claim 6, wherein the flat surface defines a circle.

10. The vision system of claim 1, wherein
    the mount has a first surface to hold the object, a second, opposing surface for coupling with the motion stage, and a side surface connecting the first and second surfaces, and
    the 3D calibration structure is formed on the side surface.

11. The vision system of claim 1, wherein the adjustment of the 3D calibration comprises run-time completion of the 3D calibration based on the information relating to the 3D calibration structure as imaged in the acquired images.

12. The vision system of claim 1, wherein the computing device is configured to
    obtain a 3D representation of at least a portion of the 3D calibration structure and at least a portion of the object based on (i) the acquired images, and (ii) the performed adjustment, and
    extract the information relating to the 3D calibration structure and the information relating to the object from the obtained 3D representation.

13. The vision system of claim 1, wherein the adjustment of the 3D calibration compensates for non-linear distortions, affine distortions, and rigid variations.

14. The vision system of claim 1, wherein the respective calibration models comprise a common origin and a common coordinate frame.

15. A kit comprising:
- a mount for a vision system, the mount comprising a three-dimensional (3D) calibration structure that includes a flat surface and one or more other surfaces, wherein the 3D calibration structure comprises periodically spaced features; and
- a computer readable medium encoding respective calibration models for the 3D calibration structure in respective predetermined orientations, the respective calibration models useable for run-time 3D calibration of the vision system using the 3D calibration structure on the mount, wherein the run-time 3D calibration of the vision system is performed by applying one of respective calibration models to each of acquired images to align the image to a common 3D coordinate frame.

16. The kit of claim 15, wherein the one or more other surfaces of the 3D calibration structure are lateral surfaces of cylindrical holes in the flat surface.

17. The kit of claim 15, wherein the 3D calibration structure comprises bars separated by channels, each of the bars including
- a flat surface forming the flat surface of the 3D calibration structure, and
- at least one tapered surface forming the one or more other surfaces of the 3D calibration structure.

18. The kit of claim 15, wherein the 3D calibration structure comprises frustums, each of the frustums including
- a flat surface forming the flat surface of the 3D calibration structure.

19. The kit of claim 18, wherein the flat surface defines a polygon.

20. The kit of claim 19, wherein the polygon is a square.

21. The kit of claim 18, wherein the flat surface defines a circle.

22. A non-transitory computer-readable medium encoding a computer program operable to cause computing device to perform operations comprising:
- obtaining images of at least a portion of an object and at least a portion of a three-dimensional (3D) calibration structure;
- performing at least an adjustment of a 3D calibration of a vision system based on information relating to the 3D calibration structure as imaged in the obtained images, wherein performing at least the adjustment of the 3D calibration comprises applying one of respective calibration models to each of the obtained images to align the image to a common 3D coordinate frame, wherein the respective calibration models have been generated for the respective predetermined orientations;
- obtaining a 3D representation of at least a portion of the 3D calibration structure and at least a portion of the object based on (i) the obtained images, and (ii) the performed adjustment;
- extracting the information relating to the 3D calibration structure and the information relating to the object from the obtained 3D representation; and
- determining 3D positions, dimensions or both of one or more features of the object based on (i) results of the 3D calibration, and (ii) information relating to the object as imaged in the obtained images.

23. The non-transitory computer-readable medium of claim 22, wherein the obtaining of images comprises:
- instructing a motion stage coupled with a mount holding the object to at least rotate the mount to predetermined orientations relative to a camera for which at least a portion of the object and at least a portion of the 3D calibration structure are concurrently in a field of view of the camera, wherein the mount comprises the 3D calibration structure that includes a flat surface and one or more other surfaces; and
- instructing the camera to acquire images when the mount is in the predetermined orientations.

* * * * *